US007197708B1

United States Patent
Frendo et al.

(10) Patent No.: US 7,197,708 B1
(45) Date of Patent: Mar. 27, 2007

(54) SET TOP TO INTERNET DEVICE COMMUNICATION AND USE

(75) Inventors: Michael Frendo, Livermore, CA (US); Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 09/742,551

(22) Filed: Dec. 20, 2000

(51) Int. Cl.
*G06F 17/00* (2006.01)

(52) U.S. Cl. .................. 715/718; 715/700; 715/769; 715/717; 715/731; 715/720

(58) Field of Classification Search ............ 345/700, 345/769, 768, 717, 718, 731, 720; 715/721–26, 715/749, 750
See application file for complete search history.

(56) References Cited

U.S. PATENT DOCUMENTS

| | | | | |
|---|---|---|---|---|
| 6,014,502 A | * | 1/2000 | Moraes ................... | 709/219 |
| 6,061,719 A | * | 5/2000 | Bendinelli et al. ....... | 709/218 |
| 6,131,162 A | * | 10/2000 | Yoshiura et al. ......... | 713/176 |
| 6,477,579 B1 | * | 11/2002 | Kunkel et al. ........... | 709/229 |
| 6,496,981 B1 | * | 12/2002 | Wistendahl et al. ...... | 725/112 |
| 2002/0034980 A1 | * | 3/2002 | Lemmons et al. ........ | 463/40 |

* cited by examiner

*Primary Examiner*—Steven Sax
*Assistant Examiner*—Peng Ke
(74) *Attorney, Agent, or Firm*—Marger Johnson & McCollom, PC

(57) ABSTRACT

A method and system for providing Web-based information that is relevant to a program being viewed on a television. A data stream providing a set of Uniform Resource Locators (URLs) is provided along with the program content. The URLs identify Web sites that are relevant to the program content. Based on user preferences specified in a user profile, URLs for Web sites that are likely to be of particular interest to the user can be culled from the overall set of URLs. These URLs are sent to a device connected to the Internet (e.g., a personal computer system), allowing the user to access Web-based information relevant to the program content. The program content continues to be displayed on the television and the Web-based information is displayed on the personal computer system. Accordingly, the user can view targeted information that is of interest without interrupting the display on the television.

12 Claims, 9 Drawing Sheets

SET TOP TO INTERNET DEVICE COMMUNICATION AND USE

TECHNICAL FIELD

The present invention relates to the electronic transfer of information over a network of communicatively coupled devices. More specifically, the present invention pertains to the distribution of targeted Web-based information that is relevant to a program being viewed on a television.

BACKGROUND ART

In many instances today, broadcasters and advertisers attempt to tie television programming and commercials to related sites on the World Wide Web ("Web"). It is becoming quite common to see, superimposed somewhere on the television screen, a banner or label identifying the Uniform Resource Locator (URL) for a Web site that can provide information supplementing the program information being displayed on the screen. It is also increasingly common for advertisers to display the URL for their Web site in their commercial. The broadcasters and advertisers hope to attract viewers to their Web sites for marketing purposes as well as to provide viewers with information more detailed than that provided during a television program or commercial.

A disadvantage to banners and the like is that they can be somewhat disruptive to viewers, blocking aspects of the program being viewed and diverting the user's attention from the program itself. In addition, banners and the like are of limited effectiveness because they place the burden of accessing the Web site on the viewer. The viewer must first make note of the URL being displayed, and then must manually enter the URL into an Internet-connected device (e.g., a computer system) in order to reach the Web site. Because of this inconvenience, many viewers will not follow through and access the promoted Web site, reducing the size of the audience that broadcasters and advertisers had hoped to reach via the Internet. The audience is further reduced by the number of viewers who are not comfortable with accessing and navigating the Internet, and who will probably not attempt to access the Web site because of the perceived difficulty in doing so.

Another problem with the prior art is that multiple URLs cannot readily be provided during the program or commercial, although there may be multiple Web sites relevant to the ongoing program or commercial that might be of interest. The display of multiple URLs would further clutter the screen, and viewers would typically not be able to make note of more than a couple of URLs at a time anyway. Accordingly, only a single URL is typically displayed, limiting viewer access to supplementary information of relevance or likely interest.

Furthermore, the URLs displayed during programs and commercials cannot be tailored for different viewers; that is, all viewers see the same URL. Thus, even if one viewer is interested in one aspect of a program while another viewer has different interests, both viewers will be directed to the same Web site.

Some products currently available, referred to in general as interactive television or Web television, attempt to make it easier to access information on the Web, but these products still have some shortcomings. Typically, these products function using some type of menu or pop-up window that appears on the television screen, obscuring aspects of the television display and distracting viewers. In addition, in order to display the Web-based information, these products typically use a split-screen or picture-in-picture type of format. Thus, instead of seeing a full-size image, viewers must contend with smaller images, reducing the quality of the display and diminishing the viewing experience. Moreover, one viewer may want to see one Web site and another viewer a different Web site; however, only one site can be viewed at a time. Thus, in addition to agreeing on which television program is to be watched, viewers must also agree on which Web site is to be viewed.

Accordingly, what is needed is a method and/or system that can more conveniently direct viewers to Web sites that pertain to what is being viewed on television. What is also needed is a method and/or system that can satisfy the above need and that can identify multiple Web sites that may be of interest. In addition, what is needed is a method and/or system that can satisfy the above needs and that can identify Web sites according to the likely interests of different viewers. Furthermore, what is needed is a method and/or system that can satisfy the above needs and that can display Web-based information, and that can allow individual viewers to view the Web-based information that is of particular interest of them, without distracting or inconveniencing other viewers. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method that can more conveniently direct viewers to Web sites that pertain to what is being viewed on television. The present invention also provides a system and method that can identify multiple Web sites that may be of interest. In addition, the present invention provides a system and method that can identify Web sites according to the likely interests of different viewers. Furthermore, the present invention provides a system and method that can display Web-based information, and that can allow individual viewers to view the Web-based information that is of particular interest of them, without distracting or inconveniencing other viewers.

The present embodiment of the present invention pertains to a method and system thereof for providing Web-based information that is relevant to a program or commercial ("program content") being viewed (and/or listened to) on a television. In one embodiment, a data stream providing a set of Uniform Resource Locators (URLs) is provided along with the program content. The URLs identify Web sites that are relevant to the program content. Based on user preferences specified in a user profile, URLs for Web sites that are likely to be of particular interest to the user can be culled from the overall set of URLs. These URLs are sent to a device connected to the Internet (e.g., a personal computer system, palmtop computer system, or the like), allowing the user to access Web-based information relevant to the program content. The program content continues to be displayed on the television and the Web-based information is displayed on the personal computer system. Accordingly, the user can view targeted information that is of interest without interrupting the display on the television.

In one embodiment, the program content and the set of URLs associated with the program content are received by the television, or by a set top box that can be either coupled to the television or integrated with the television into a single unit. The program content is displayed on the television, and the set of URLs are forwarded to the Internet-connected device. In this embodiment, the user profile resides on the Internet-connected device. Based on the preferences specified in the user profile, a subset of the URLs can be selected and the Internet-connected device can be directed to the associated Web sites. The Internet-connected device can also be directed to other Web sites that may be of interest based on the information in the user profile.

In another embodiment, the user profile resides on the television (e.g., the set top box), and only the subset of URLs selected based on the user profile are forwarded to the Internet-connected device.

In yet another embodiment, the television (set top box) is connected with the Internet. The set of URLs received with the program content are forwarded via the Internet to a service provider. The user profile resides on the service provider's equipment. A subset of URLs are selected based on the user profile and forwarded either to the Internet-connected device or back to the television. In this latter case, the television can forward the subset of URLs to the Internet-connected device. Alternatively, the service provider can send Web-based information (e.g., Web pages) to the Internet-connected device instead of sending the URLs. In addition, the user can send information to the service provider or to the Web pages via the Internet-connected device.

In another embodiment, only the program content is received by the television (set top box) connected to the Internet. In this embodiment, the television (set top box) communicates to the service provider a channel number (or other information) identifying the program being viewed. Similar to the implementations described above, depending on where the user profile resides, the service provider can send a set of URLs, a subset of URLs based on the user's profile, or Web-based information to the television (set top box) or the Internet-connected device.

In accordance with the present invention, multiple Internet-connected devices can be used and individual profiles can be established for each user. Thus, one user can receive one set of targeted information relevant to the program being viewed on the television, and another user can receive a different set of targeted information. Each user can separately view the targeted information (e.g., Web page) they receive on their respective Internet-connected device, while jointly viewing the program (or commercial) displayed on the television. In addition, via their Internet-connected device, each user can interact with other users that are also connected with the same Web site and that may be viewing the same television program or commercial.

Furthermore, with the television connected to the Internet, the television (set top box) can receive commands from other Internet-connected devices. Accordingly, the television can be programmed to perform functions based on instructions and commands received from devices in remote locations.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
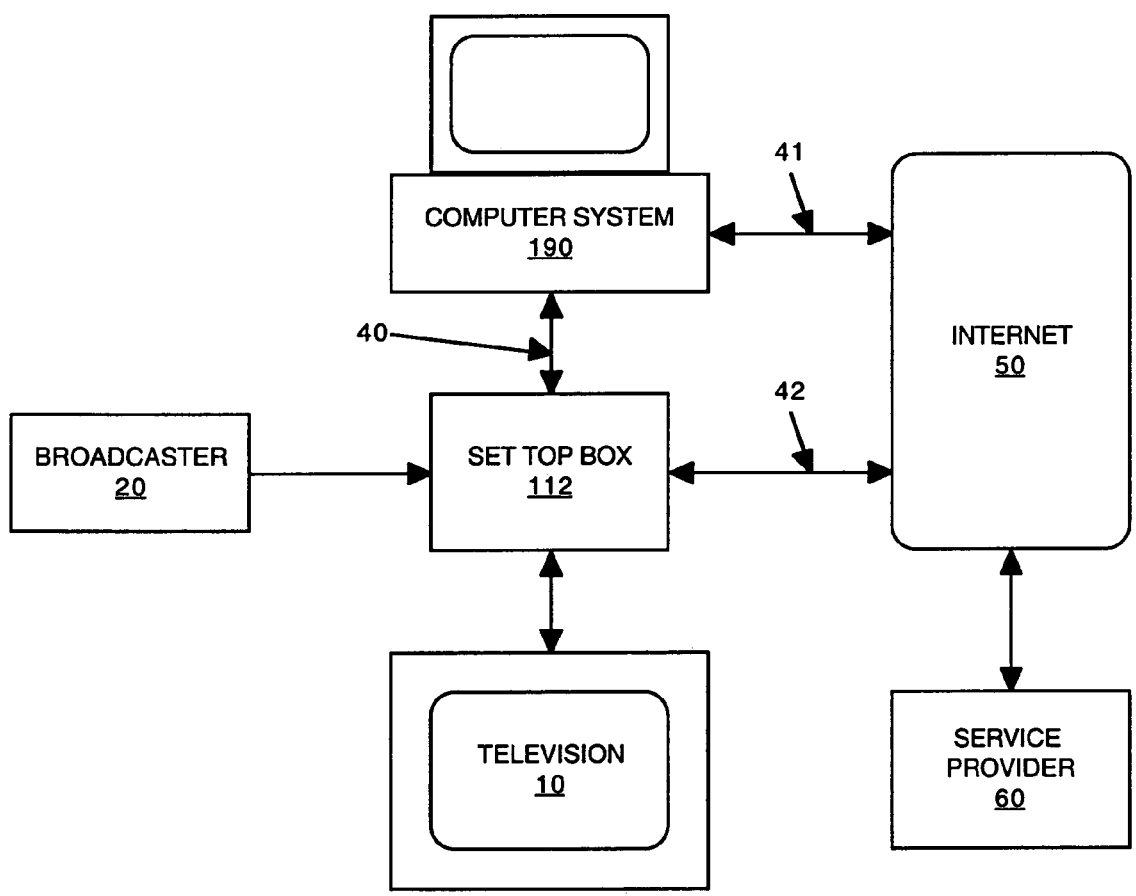
FIG. 1 is a block diagram illustrating an exemplary network of communicatively coupled devices upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "selecting," "comparing," "identifying," "monitoring," "adding," "communicating," "sending" or the like, refer to actions and processes (e.g., processes 500 and 600 of FIGS. 5 and 6, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

FIG. 1 is a block diagram illustrating one embodiment of a network (170) of communicatively coupled devices upon which embodiments of the present invention may be practiced. Various known mechanisms can be used for coupling each of the devices. For example, some or all of the devices can be communicatively coupled using any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Some or all of the devices can alternatively be coupled using a serial bus (e.g., RS232 or IEEE 1394), a parallel bus, a Universal Serial Bus (USB), or any other type of workable connection. It is also appreciated that wireless connections (such as but not limited to Bluetooth, IEEE 802.11, or infrared wireless connections) can also be used to communicatively couple the devices.

In the present embodiment, set top box 112 is for receiving signals (including digital signals, satellite signals, and cable signals) from broadcaster 20. It is appreciated that set top box 112 can be integrated with television 10 as a single unit; alternatively, set top box 112 and television 10 can be separate units that are communicatively coupled as described above.

The signals from broadcaster 20 provide program content (e.g., audio and video signals) for programs and commercials that can be displayed on television 10, where they can be viewed by one or more users. In one embodiment, broadcaster 20 also provides, along with the program content, a data stream that includes Uniform Resource Locators (URLS) that identify sites on the World Wide Web (Web sites) that are associated with the program content. In one embodiment, the data stream containing the URLs is embedded in the signal provided by broadcaster 20.

As will be seen, the URLs provided by broadcaster 20 can be used by a viewer to access Web sites relevant to the program content being viewed on television 10. The Web-based information (e.g. Web pages) provided by the Web sites can be viewed using computer system 190 without disruption of the program content viewable on television 10. In one embodiment, user profiles are specified for each user and implemented on set top box 112 and/or computer system 190 in order to selectively identify Web sites that may be of special interest to a particular user. Additional information is provided in conjunction with FIGS. 4A through 4D, below.

Television 10 and/or set top box 112 are optionally coupled to computer system 190 via the communication link 40 as well as via the Internet 50; alternatively, television 10 (set top box 112) may be coupled to computer system 190 only via the Internet 50 (e.g., through communication link 41, the Internet 50, and communication link 42). Similarly, either television 10 (set top box 112) or computer system 190 may not be coupled to the Internet 50. In this latter case, one of the devices is coupled to the Internet 50, and the other device can send and receive information to and from the Internet 50 via the Internet-connected device.

Computer system 190 can be a desktop computer system, a laptop computer system, a portable computer system (e.g., a palmtop, a handheld, a personal digital assistant, or the like), a Web pad, or any other device suitable for receiving and displaying Web pages. Although only a single computer system 190 is shown in FIG. 1, it is appreciated that any number of such devices may be used in accordance with the present invention.

In one embodiment, television 10 (set top box 112) can receive commands from other Internet-connected devices. Accordingly, the television can be programmed to perform functions based on instructions and commands received from devices in remote locations.

Service provider 60 is a network device (e.g., a server computer system) that provides certain services pertaining to the distribution of Web-based information relevant to program content (e.g., programs, commercials, and the like) received by and/or viewable on television 10. The types of services performed by service provider 60 vary according to the different embodiments of the present invention. In one embodiment, user profiles are specified for each user and implemented on service provider 60 in order to selectively identify Web sites that may be of special interest to a particular user. Additional information is provided in conjunction with FIGS. 4A through 4D, below.

In one embodiment, with reference still to FIG. 1, the URLs that identify sites on the Web sites that are associated with the program content are provided by service provider 60 instead of by broadcaster 20. In this embodiment, service provider 60 receives information (e.g., the channel number) that identifies what program content is being viewed on television 10, and in response service provider 60 provides the URLs associated with that program content. As in the embodiment described above, a viewer accesses the Web sites identified using the URLs provided by service provider 60, and views the Web pages using computer system 190 without disrupting the program content viewable on television 10.

Figure 2:
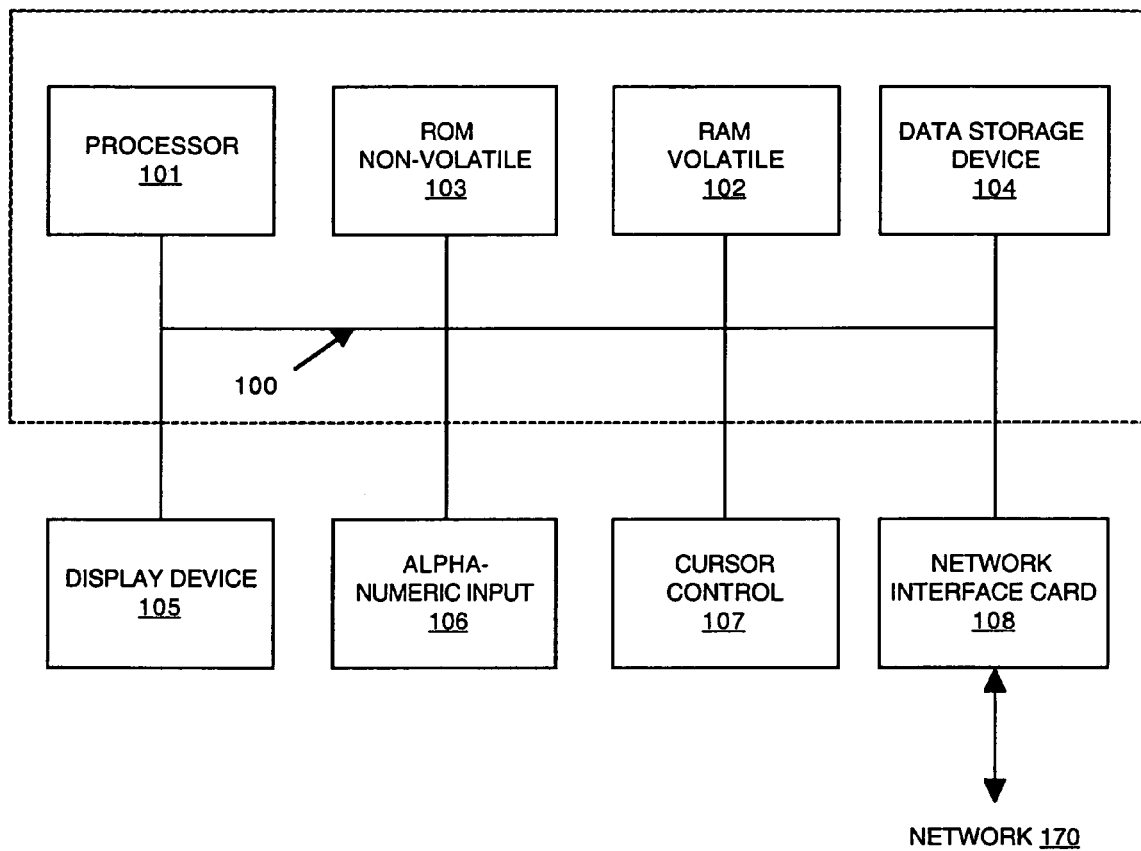
FIG. 2 is a block diagram of an exemplary computer system upon which embodiments of the present invention may be practiced.

Refer now to FIG. 2 which illustrates an exemplary computer system 190 upon which embodiments of the present invention may be practiced. Computer system 190 can be a desktop computer system, a laptop computer system, a portable computer system (e.g., a palmtop, a handheld, a personal digital assistant, or the like), a Web pad, or any other device suitable for receiving and displaying Web pages. It is appreciated that computer system 190 also exemplifies a Web (network) device such as service provider 60 (FIG. 1).

In general, computer system 190 of FIG. 2 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 to the Internet or to network 170 (FIG. 1).

With reference still to FIG. 2, display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 3:
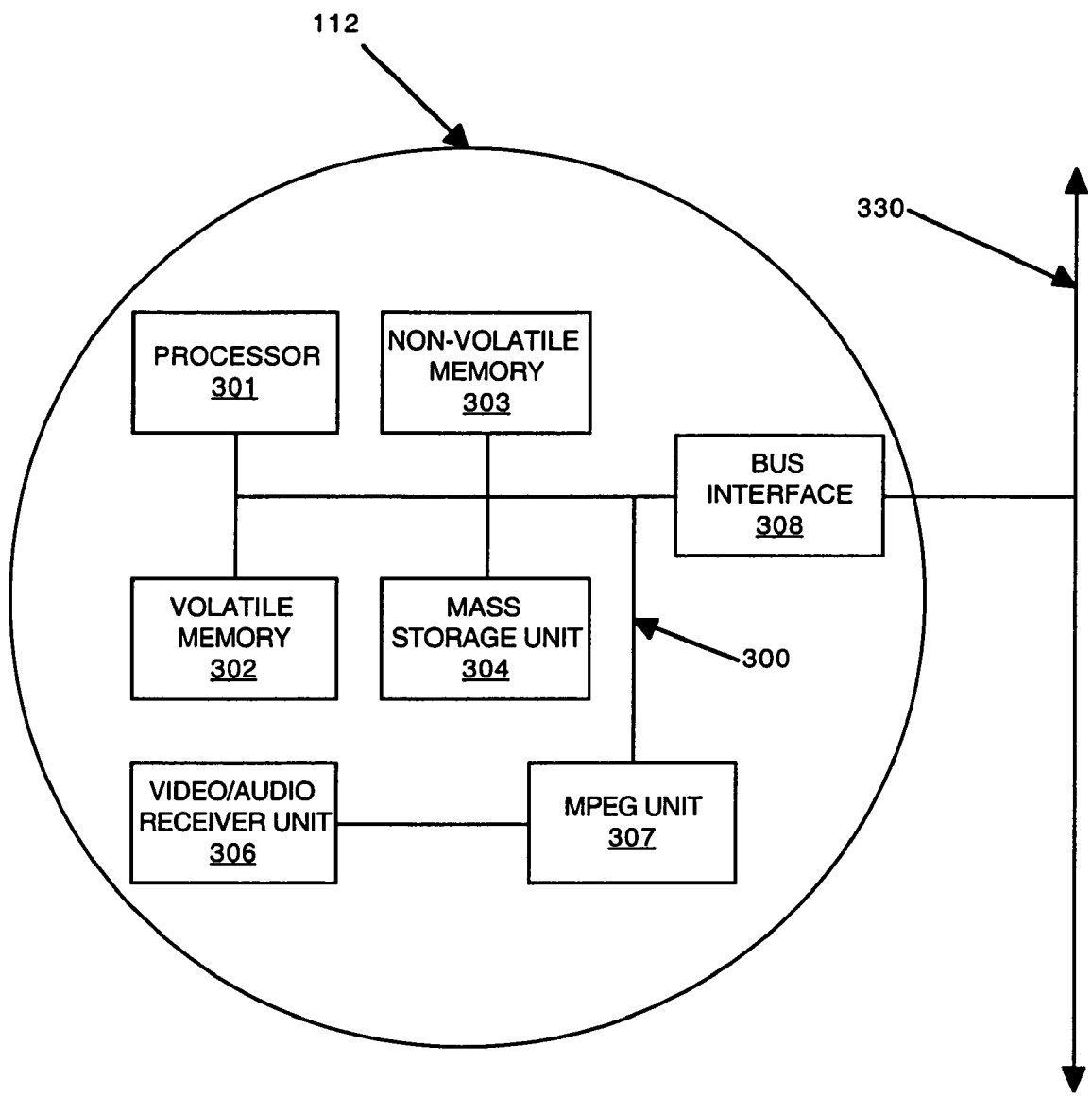
FIG. 3 is a block diagram of an exemplary set top box upon which embodiments of the present invention may be practiced.

Refer now to FIG. 3, which is a block diagram of set top box 112 upon which embodiments of the present invention can be implemented. Although a variety of different systems can be used in accordance with the present invention, an exemplary system is represented by set top box 112. It is understood that set top box 112 may be integrated with television 10 (FIG. 1) as a single unit, or that set top box 112 may instead by coupled to television 10 (as well as other devices) via bus 330.

In the present embodiment, set top box 112 of FIG. 2 includes processor 301 coupled with an internal address/data bus 300 for processing information and instructions. Volatile memory 302 (e.g., random access memory), for storing information and instructions for processor 301, is also coupled to bus 300. Non-volatile memory 303 (e.g., read only memory), for storing static information and instructions for processor 301, is coupled to bus 300. Set top box 112 optionally includes mass storage unit 304 (e.g., a data storage device such as a magnetic or optical disk and disk drive) coupled to bus 300 for storing information and instructions. Set top box 112 also includes video/audio receiver unit 306 and Moving Pictures Expert Group (MPEG) unit 307 coupled to bus 300. Bus interface 308 is used for interfacing with a television 10 (FIG. 1) via bus 330.

FIGS. 4A, 4B, 4C and 4D are data flow diagrams illustrating various embodiments for providing Web-based information that is relevant to television program content in accordance with the present invention. Although there may be other differences, the primary differences in these embodiments pertain to the source of the URLs that are used to identify and access Web sites containing information relevant to the program content, and the location of the user profiles that are used to cull from the URLs the identities of Web sites that are likely to be of particular interest to each individual user. To simplify the discussion, only a single computer system 190 is shown in FIGS. 4A through 4D; however, it will be apparent from the discussion herein that multiple computer systems (or like devices) can be used in accordance with the present invention, so that multiple users can individually view Web-based information while program content is displayed on television 10. It will also be apparent from the discussion herein that aspects of each of the various embodiments illustrated by FIGS. 4A through 4D can be combined in different ways in accordance with the present invention.

Figure 4A:
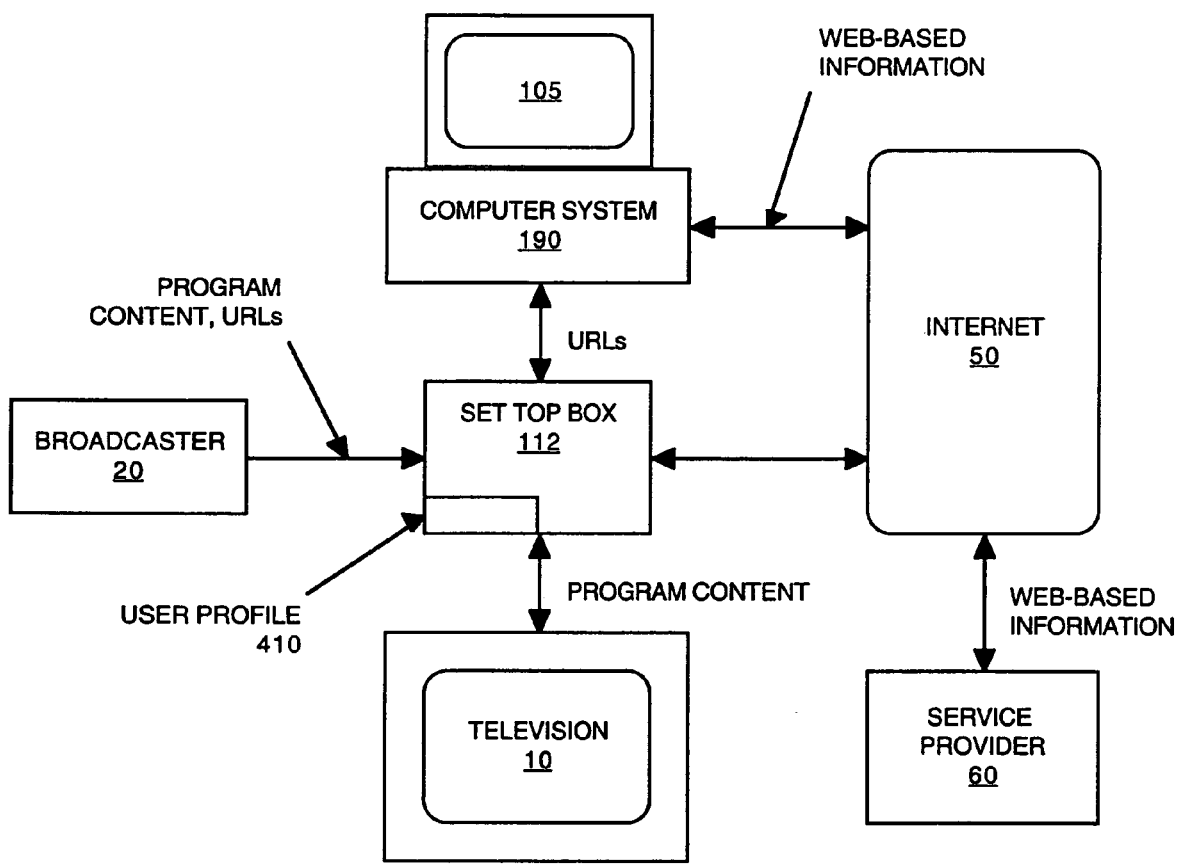
FIGS. 4A, 4B, 4C and 4D are data flow diagrams illustrating various embodiments for providing Web-based information that is relevant to television program content in accordance with the present invention.

With reference first to FIG. 4A, in this embodiment, television 10 (set top box 112) receives program content and a set of URLs associated with the program content from broadcaster 20. In one embodiment, the set of URLs associated with the program content are provided in a data stream embedded in the broadcast signal. The URLs identify Web sites containing information supplementary to or relevant to the program content.

In accordance with the present invention, multiple URLs can be provided for a single instance of program content, and the set of URLs can be dynamically changed during the course of the broadcast (that is, different URLs can be provided at different points during the program). In addition, a different set of URLs can be provided for different program content; that is, one set of URLs can be provided for one broadcast channel, and a different set of URLs for a different broadcast channel.

In accordance with present invention, the URLs are characterized according to the type of information that is provided by their respective Web sites. For example, a URL may be generally characterized as being for a Web site that provides information regarding automobiles, and further characterized according to the type(s) of automobiles, the specific manufacturer(s), and the like. The URLs (Web sites) can be characterized either by the owner/maintainer of the Web site or by an independent vendor that provides such a service in accordance with the present invention. As will be seen, user profiles can be used with the characteristic information to select, on behalf of each user, the URLs that are of particular interest to a user.

In accordance with the present embodiment of the present invention, the set of URLs, and their respective characteristics, are received and stored in set top box 112 (or television 10). Accordingly, a user (viewer) does not need to manually record each of the URLs received.

In the present embodiment, user profile 410 resides on set top box 112 (e.g., in one of the memory units illustrated in FIG. 3). A different user profile 410 can be provided for each potential or actual viewer. In one embodiment, each user inputs into their individual user profile the particular characteristics of the type of Web-based information in which they are interested; in this embodiment, the user generates and maintains user profile 410, and deliberately adds and removes items from user profile 410. In another embodiment, the URLs (Web sites) executed by a user are monitored, and characteristics associated with these URLs are added automatically to user profile 410. In yet another embodiment, the user profile 410 can be modified according to criteria that are time-based.

For example, if a user accesses a Web site for purchasing new cars, then characteristics describing this type of Web site can be automatically added to user profile 410. If the user subsequently does not access new car Web sites for a predetermined period of time, then the characteristics describing these types of sites can be automatically removed from user profile 410. It is appreciated that other features can be implemented in accordance with the present invention to modify and maintain user profile 410 in order to enhance its effectiveness with regard to identifying Web-based information that may be of particular interest to a user.

In accordance with one embodiment of the present invention, the characteristics in the user profile 410 are compared to the characteristics associated with each URL (as described above), in order to identify a subset of the overall set of URLs that are particular interest to each user. For example, the user can indicate that he/she is interested in purchasing a new automobile. Accordingly, the URLs received from broadcaster 20 will be screened, and URLs characterized as being associated with automobiles will be selectively identified for the user. The user can narrow the selection of URLs by specifying additional characteristics, such as the make of automobile, price range, and the like. Thus, in accordance with the present invention, the list of Web sites that is presented to each user can be customized according to the viewer's interests.

In the present embodiment, the overall set of URLs, or the subset of URLs selectively identified based on user profile 410, are forwarded by television 10 (set top box 112) to computer system 190. Computer system 190 can be a desktop computer system, a laptop computer system, a portable computer system (e.g., a palmtop, a handheld, a personal digital assistant, or the like), a Web pad, or any other device suitable for receiving and displaying Web pages.

Television 10 (set top box 112) and computer system 190 are communicatively coupled as described above in conjunction with FIG. 1. Note that television 10 (set top box 112) may or may not be communicatively coupled with the Internet 50 or service provider 60. When television 10 (set top box 112) is communicatively coupled with the Internet 50, communication between television 10 (set top box 112) and computer system 190 can occur via the Internet 50. In this case, Web-based information can be received via set top box 112 and forwarded to computer system 190.

Continuing with reference to FIG. 4A, in one embodiment, the list of URLs are stored (queued) in a memory unit of computer system 190, so that they can be accessed and executed at the user's convenience. The user can optionally choose to execute the URLs during the course of viewing the program content on television 10, or the URLs can be executed at a later time. In another embodiment, the URLs are executed automatically as they are received by computer system 190. The Web-based information can be provided by service provider 60, or by another network device (e.g., Web server).

In any case, when the URLs are executed, the associated Web page(s) are displayed on display device 105, while the program content continues to be displayed on television 10. Thus, in accordance with the present invention, the Web-based information can be viewed without disturbing other viewers of television 10.

Furthermore, when there are multiple users, each operating a different computer system 190, each user will receive a targeted set (or subset) of URLs tailored according to their user profile 410. Accordingly, each user can view different Web pages while commonly viewing the same display on television 10.

Figure 4B:
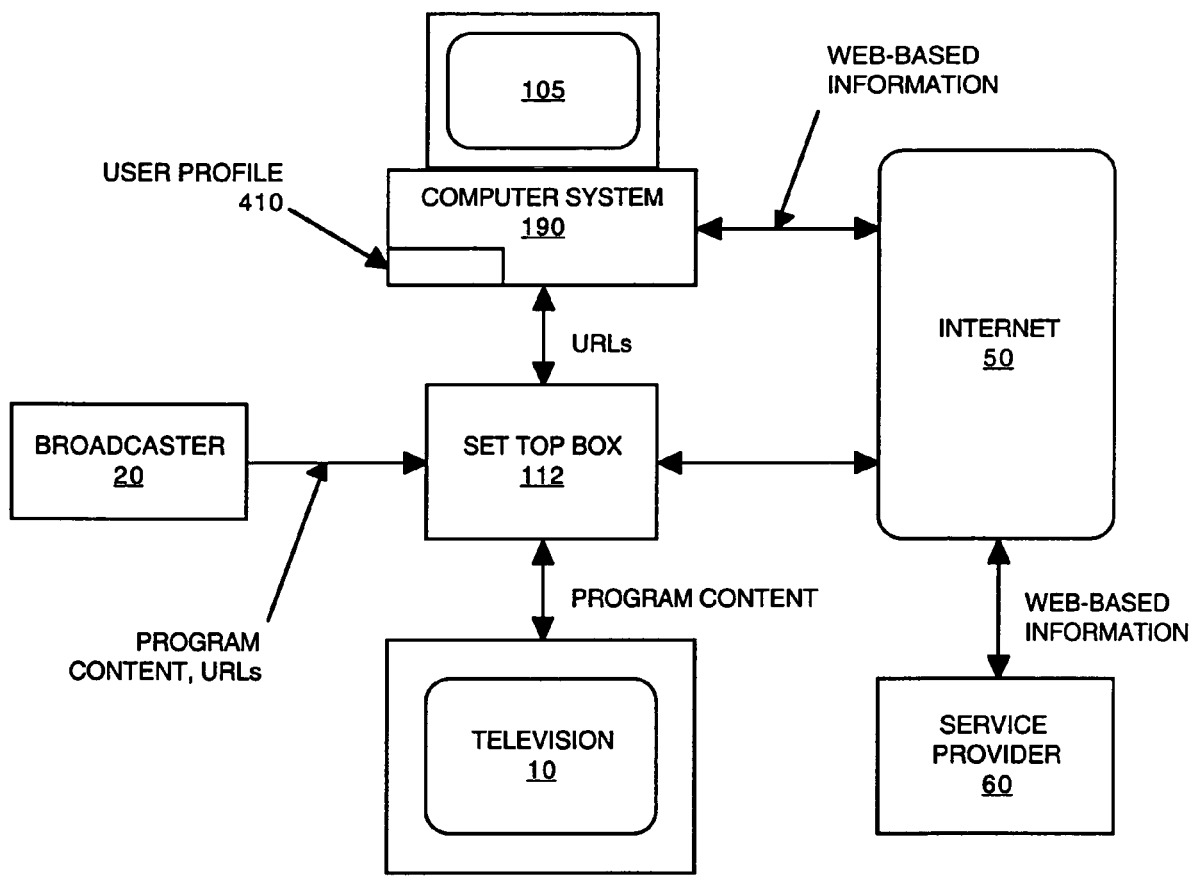

FIG. 4B illustrates the data flow through another embodiment of a system for providing Web-based information that is relevant to television program content in accordance with the present invention. In comparison to the embodiment of FIG. 4A, user profile 410 resides on computer system 190. When multiple computer systems are being used, a user profile 410 can reside on each computer system. It is appreciated that a user profile 410 for one user can reside on set top box 112, and a user profile 410 for another user can reside on computer system 190.

The embodiment of FIG. 4B functions in a manner similar to that described above. Program content and URLs are received from broadcaster 20 at television 10 (set top box 112). The overall set of URLs that are received are forwarded to computer system 190, where the URLs can be screened according to the particular interests described by each user in user profile 410. Web-based information is provided by service provider 60 (or another Web server) to computer system 190 via the Internet 50. Alternatively, Web-based information can be provided to computer system 190 via the Internet 50 and set top box 112 (when that device is communicatively coupled to the Internet).

Figure 4C:
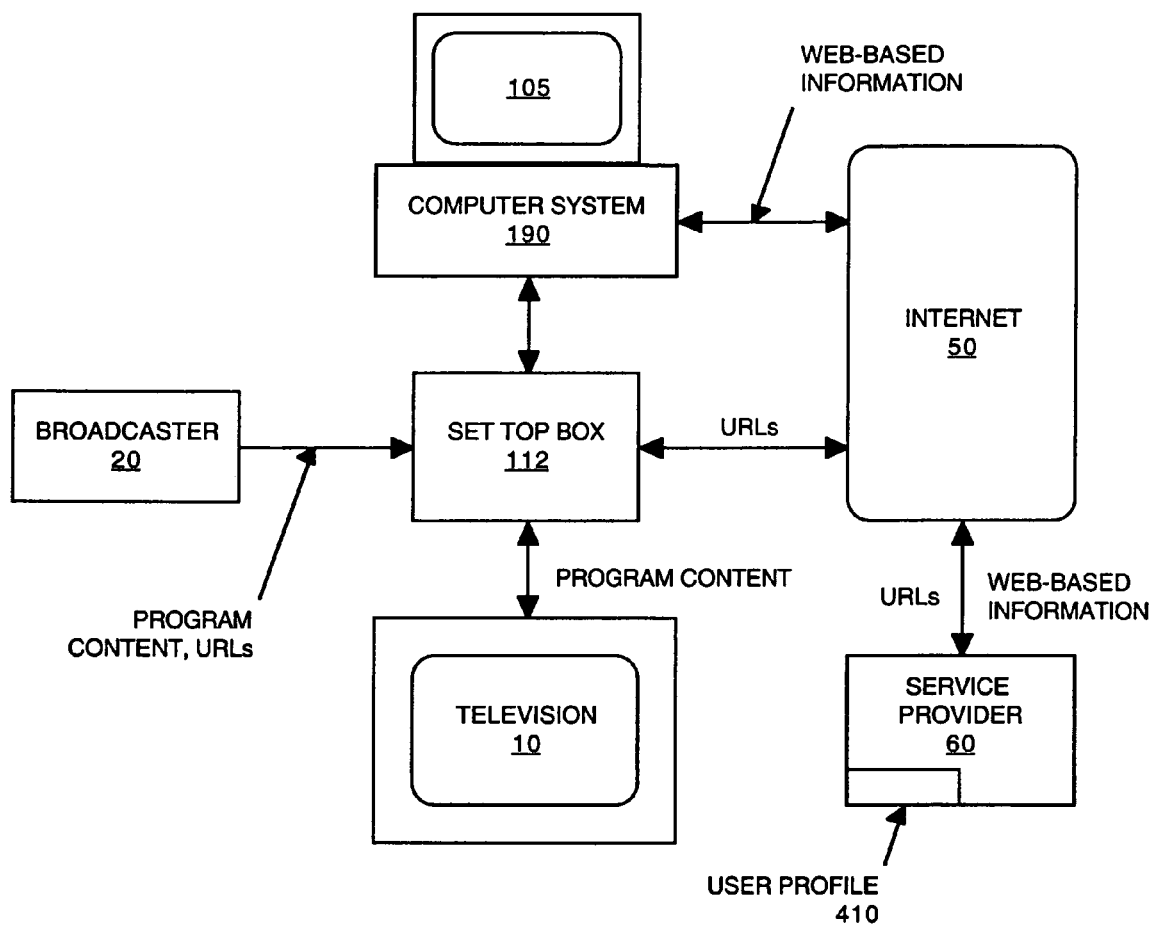

FIG. 4C illustrates the data flow through another embodiment of a system for providing Web-based information that is relevant to television program content in accordance with the present invention. In comparison to the embodiment of FIGS. 4A and 4B, user profile 410 resides on service provider 60. As described above, a different user profile can be maintained on service provider 60 for each individual user. It is appreciated that a user profile 410 for one user can reside on set top box 112, a user profile 410 for another user can reside on computer system 190, and a user profile 410 for yet another user can reside on service provider 60.

The embodiment of FIG. 4C functions in a manner similar to that described above. Program content and URLs are received from broadcaster 20 at television 10 (set top box 112). The overall set of URLs that are received are forwarded to service provider 60, where the URLs can be screened according to the particular interests described by each user in user profile 410. Web-based information is provided by service provider 60 (or another Web server) to computer system 190 via the Internet 50. Alternatively, Web-based information can be provided to computer system 190 via the Internet 50 and set top box 112 (when that device is communicatively coupled to the Internet).

Figure 4D:
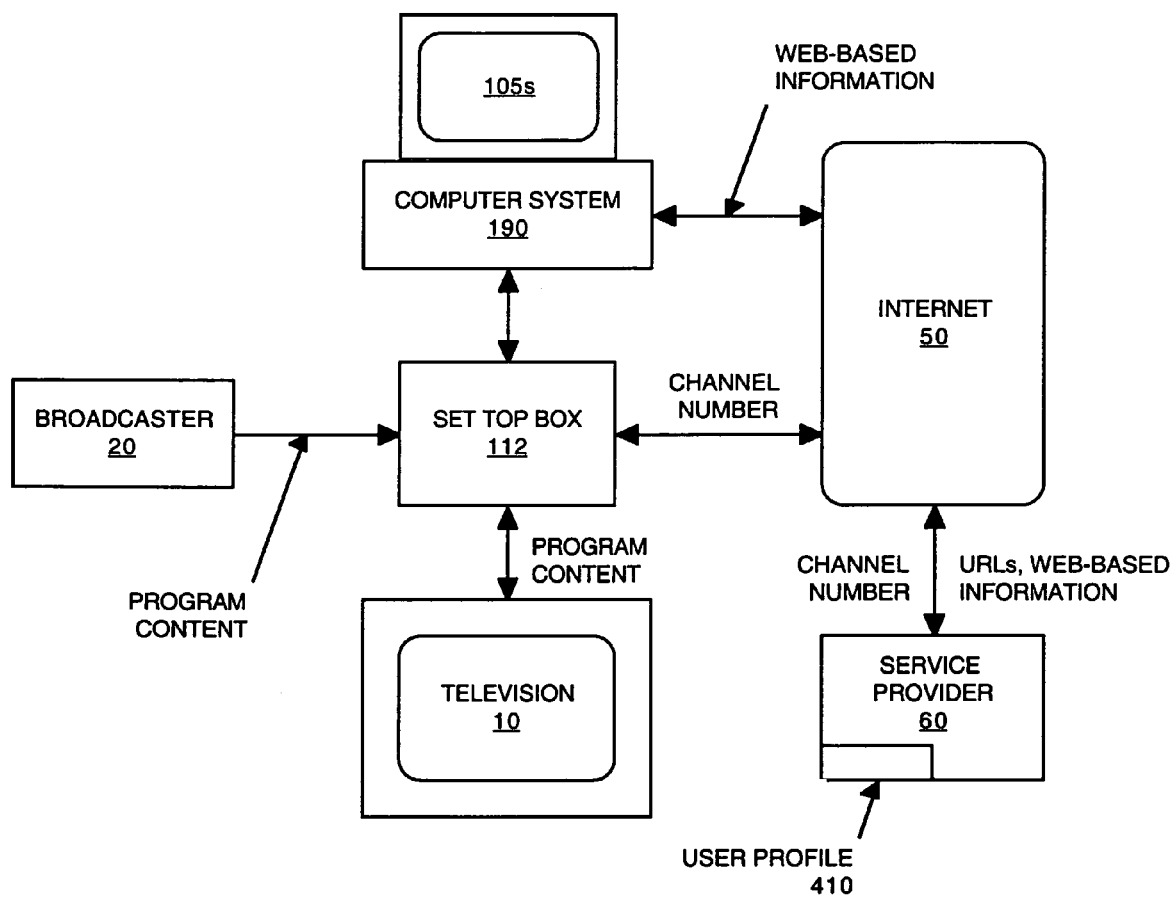

FIG. 4D illustrates the data flow through yet another embodiment of a system for providing Web-based information that is relevant to television program content in accordance with the present invention. In comparison to FIGS. 4A through 4C, only program content is received by television 10 (set top box 112) from broadcaster 20 (URLs associated with the program content are not received from broadcaster 20). In this embodiment, information identifying the program content is sent from set top box 112 to service provider 60. In one embodiment, the channel number associated with the program content is sent to service provider 60. Service provider 60 in turn identifies the set of URLs associated with the program content, and sends those URLs to set top box 112 and/or to computer system 190.

In one embodiment, user profile 410 resides on service provider 60, so that service provider 60 can identify the subset of URLs that are of particular interest to each user. In this embodiment, service provider 60 sends the subset of URLs that are of particular interest to a user to that user's computer system 190. In other embodiments, user profile 410 can reside on computer system 190 and/or on television 10 (set top box 112).

Figure 5:
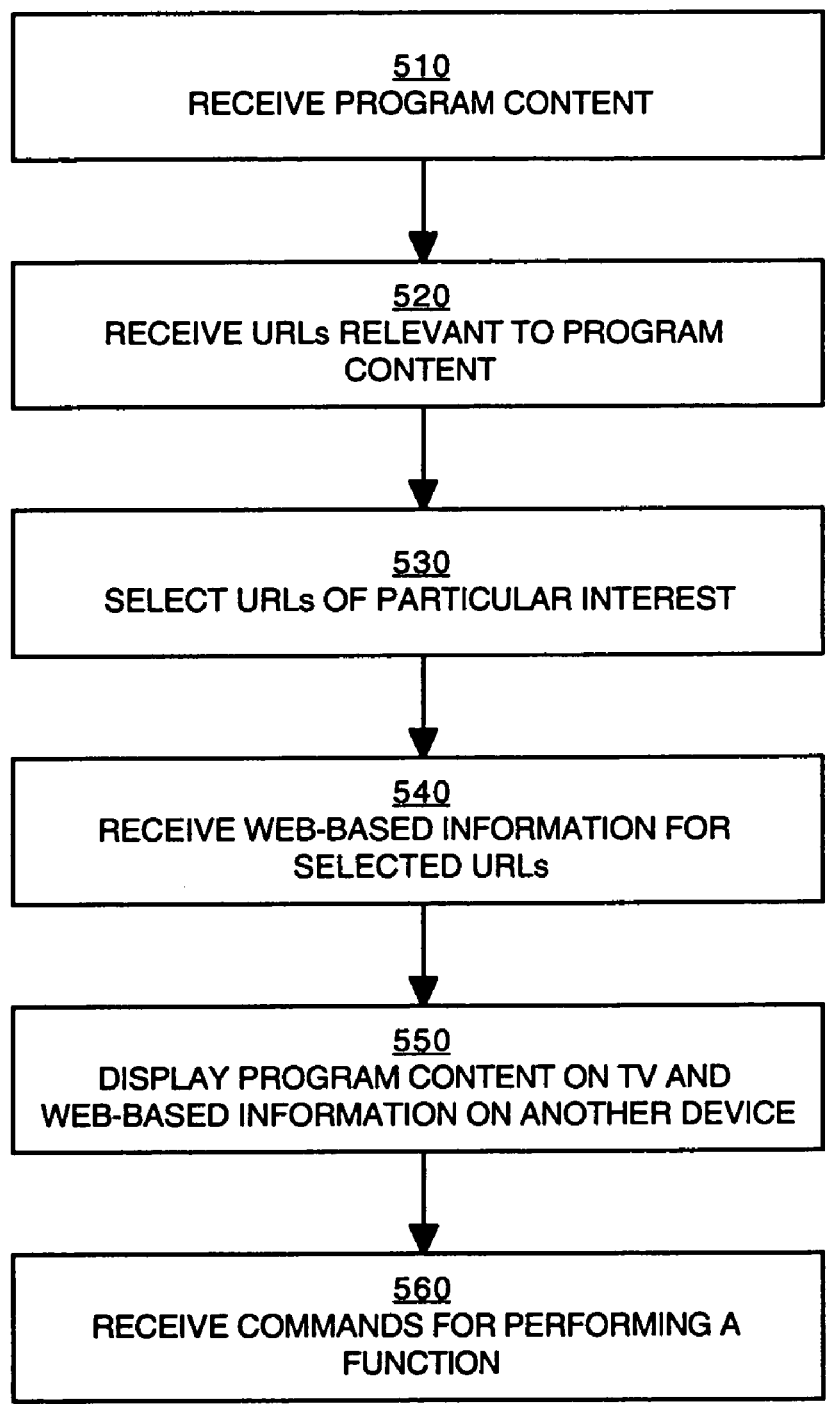
FIG. 5 is a flowchart of the steps in a process for providing Web-based information that is relevant to television program content in accordance with one embodiment of the present invention.

FIG. 5 is a flowchart of the steps in a process 500 for providing Web-based information relevant to television program content in accordance with one embodiment of the present invention. Process 500 is implemented primarily using computer system 190 and television 10 (set top box 112). Process 500 preferably pertains to the embodiments of FIGS. 4A through 4D. For clarity of discussion, the present invention is described in the context of a single user and a single computer system 190; however, it will be apparent from the discussion that multiple users and computer systems can be accommodated in accordance with the present invention.

In step 510 of FIG. 5, with reference also to FIGS. 4A through 4D, program content is received from broadcaster 20.

In step 520, the overall set of URLs identifying Web sites of relevance to the program content are received. In one embodiment, the URLs are received from broadcaster 20, separately from or embedded within the signal carrying the program content. In another embodiment, the URLs are received from service provider 60 instead of from broadcaster 20. The URLs are received automatically, so there is no need for a user to make note (e.g., write down) the relevant URLs. In addition, multiple URLs can be received simultaneously for each program or commercial, and a different set of URLs can be provided at different times during the course of the program or commercial.

In step 530, in one embodiment, the subset of URLs of particular interest to a user are selected based on the user's profile 410 (FIGS. 4A through 4D). It is understood that the selection of the subset of URLs can be made in combination with the receipt of the overall set of URLs from broadcaster 20 or service provider 60. That is, steps 520 and 530 can be performed in combination.

In step 540 of FIG. 5, Web-based information is received from service provider 60 (or another Internet-connected or network device) for the selected set of URLs. In one embodiment, the user selectively executes the URLs. In another embodiment, the URLs are executed automatically, so that the Web page(s) are automatically displayed.

In one embodiment, the URLs are executed concurrently with the program content, so that the Web page(s) are received at about the same time that the relevant program content is being displayed on television 10. Alternatively, the URLs can be queued in memory of computer system 190, and executed at a later time.

In step 550, the program content is displayed on television 10 and the Web-based information for the executed URLs is displayed on another device (e.g., computer system 190). As such, the program content on television 10 is displayed without interruption, and the television display does not have to be altered or adjusted to display the Web page(s). In addition, other television viewers are not distracted by the display of Web page(s).

In step 560, because set top box 112 is communicatively coupled to the Internet 50 (FIG. 1), it can receive commands from other devices via the Internet 50. Thus, a user in a remote location can send a command via the Internet 50 to program set top box 112 to perform a specified function. For example, the remote user can command set top box 112 to perform a record function, to receive pay-per-view events, or to block certain broadcast channels from being received or displayed.

Figure 6:
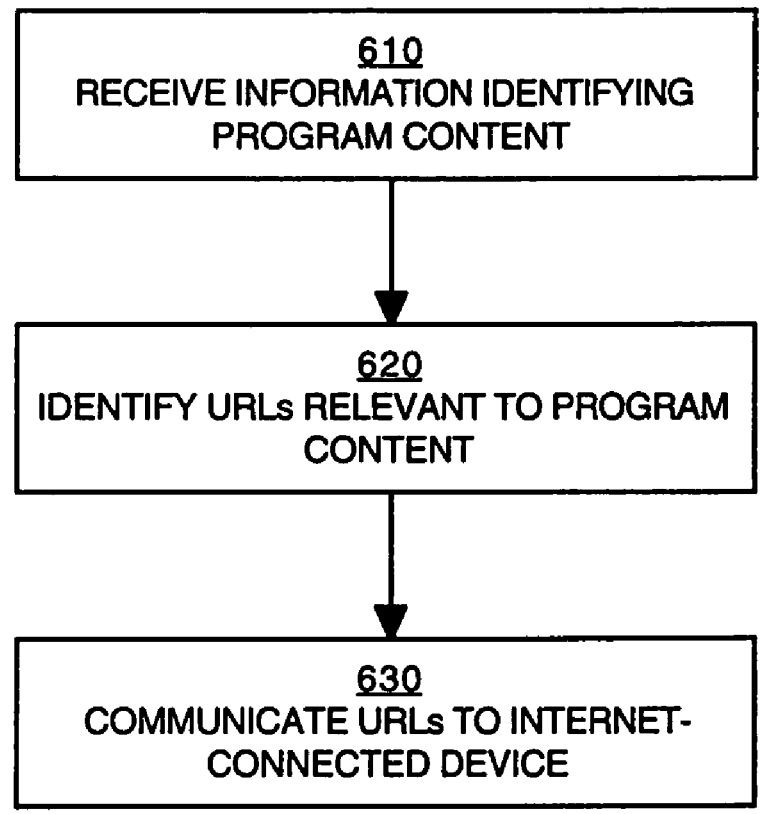
FIG. 6 is a flowchart of the steps in a process for providing Web-based information that is relevant to television program content in accordance with another embodiment of the present invention.

FIG. 6 is a flowchart of the steps in a process 600 for providing Web-based information relevant to television program content in accordance with another embodiment of the present invention. Process 600 is implemented primarily using service provider 60 (that is, a server computer system or similar network device). Process 600 preferably pertains to the embodiment of FIG. 4D.

In step 610 of FIG. 6, with reference also to FIG. 4D, information is received identifying the particular program content being viewed on television 10. In one embodiment, service provider 60 receives the channel number for the particular broadcast channel being viewed on television 10.

In step 620, the URLs relevant to the program content identified in step 610 are identified. In one embodiment, the overall set of URLs relevant to the program content are identified. In another embodiment, user profile 410 resides on service provider 60, in which case the subset of URLs relevant to the program content and of particular interest to the user are identified.

In step 630, the URLs identified in step 620 are communicated via the Internet 50 to television 10 (set top box 112) and/or computer system 190. As described above, the URLs can be dynamically changed during the course of the program or commercial. The URLs so communicated can then be executed by a user as described above.

The present invention thus provides a method and system thereof that can more conveniently direct viewers to Web sites that pertain to what is being viewed on a television. The present invention also provides a system and method that can identify multiple Web sites that may be of interest. In addition, the present invention provides a system and method that can identify Web sites according to the likely interests of different viewers. Furthermore, the present invention provides a system and method that can display Web-based information, and that can allow individual viewers to view the Web-based information that is of particular interest of them, without distracting or inconveniencing other viewers.

The preferred embodiment of the present invention, set top to Internet device communication and use, is thus described. While the present invention has been described in particular embodiments, it should be appreciated that the present invention should not be construed as limited by such embodiments, but rather construed according to the following claims.

What is claimed is:

1. In a server computer system communicatively coupled to the Internet, a method for providing a user with Web-based information associated with program content viewable on a television, said method comprising:
    a) receiving information at said server computer system via the Internet, said information comprising a channel number for a channel on which program content is being received by a television from a broadcaster wherein said broadcaster does not provide Uniform Resource Locators (URLs) corresponding to said program content, said channel number identified by a set top box coupled to said television and to the Internet, said channel number sent to said server computer system from said set top box;
    b) said server computer system identifying a set of URLs for Web sites associated with said program content using said channel number; and
    c) communicating a first subset of one or more of said URLs in said set of URLs from said server computer system to a first computer system that is communicatively coupled to said server computer system via the Internet and communicating a second subset of one or more of said URLs in said set of URLs from said server computer system to a second computer system that is communicatively coupled to said server computer system via the Internet, wherein said server computer system uses information in a first user profile and information in a second user profile to screen said set of URLs and to select from said set of URLs said first subset and said second subset, respectively;
    wherein said first and second subsets are respectively stored at said first and second computer systems separately from said program content such that said first and second subsets are retrievable from said first and second computer systems without accessing said program content, wherein said receiving, identifying and communicating are performed automatically without user intervention; and
    wherein said program content is displayed on said television, Web-based information associated with said first subset of URLs is retrieved and displayed separately on said first computer system, and Web-based information associated with said second subset of URLs is retrieved and displayed separately on said second computer system such that different users can view different Web pages while viewing the same said program content on said television.

2. The method as recited in claim 1 further comprising:
comparing characteristics describing each URL in said set of URLs with user-specified characteristics in said first user profile;
identifying said first subset of said set of URLs, said first subset satisfying said user-specified characteristics; and
storing said first subset of URLs but not the entire said set of URLs.

3. The method as recited in claim 2 further comprising:
monitoring URLs selected by a user associated with said first user profile; and
adding characteristics describing said URLs selected by said user to said first user profile.

4. The method as recited in claim 1 wherein said first and second subsets are communicated from said server computer system to said first and second computer systems via said set top box.

5. A server computer system communicatively coupled to the Internet, said server computer system comprising:
a processor; and
a memory unit coupled to said processor, said memory unit containing instructions that when executed implement a computer-implemented method providing a user with Web-based information associated with program content viewable on a television, said method comprising:
a) receiving information at said server computer system via the Internet, said information comprising a channel number for a channel on which program content is being received by a television from a broadcaster wherein said broadcaster does not provide Uniform Resource Locators (URLs) corresponding to said program content, said channel number identified by a set top box coupled to said television and to the Internet, said channel number sent to said server computer system from said set top box;
b) said server computer system identifying a set of URLs for Web sites associated with said program content using said channel number; and
c) communicating a first subset of one or more of said URLs in said set of URLs from said server computer system to a first computer system that is communicatively coupled to said server computer system via the Internet and communicating a second subset of one or more of said URLs in said set of URLs from said server computer system to a second computer system that is communicatively coupled to said server computer system via the Internet, wherein said server computer system uses information in a first user profile and information in a second user profile to screen said set of URLs and to select from said set of URLs said first subset and said second subset, respectively;
wherein said first and second subsets are respectively stored at said first and second computer systems separately from said program content such that said first and second subsets are retrievable from said first and second computer systems without accessing said program content, wherein said receiving, identifying and communicating are performed automatically without user intervention; and
wherein said program content is displayed on said television, Web-based information associated with said first subset of URLs is retrieved and displayed separately on said first computer system, and Web-based information associated with said second subset of URLs is retrieved and displayed separately on said second computer system such that different users can view different Web pages while viewing the same said program content on said television.

6. The server computer system of claim 5 wherein said method further comprises:
comparing characteristics describing each URL in said set of URLs with user-specified characteristics in said first user profile;
identifying said first subset of said set of URLs, said first subset satisfying said user-specified characteristics; and
storing said first subset of URLs but not the entire said set of URLs.

7. The server computer system of claim 6 wherein said method further comprises:
monitoring URLs selected by a user associated with said first user profile; and
adding characteristics describing said URLs selected by said user to said first user profile.

8. The server computer system of claim 5 wherein said first and second subsets are communicated from said server computer system to said first and second computer systems via said set top box.

9. A computer-usable medium having computer-readable program code embodied therein for causing a server computer system communicatively coupled to the Internet to perform a method for providing a user with Web-based information associated with program content viewable on a television, said method comprising:
a) receiving information at said server computer system via the Internet, said information comprising a channel number for a channel on which program content is being received by a television from a broadcaster wherein said broadcaster does not provide Uniform Resource Locators (URLs) corresponding to said program content, said channel number identified by a set top box coupled to said television and to the Internet, said channel number sent to said server computer system from said set top box;
b) said server computer system identifying a set of URLs for Web sites associated with said program content using said channel number; and
c) communicating a first subset of one or more of said URLs in said set of URLs from said server computer system to a first computer system that is communicatively coupled to said server computer system via the Internet and communicating a second subset of one or more of said URLs in said set of URLs from said server computer system to a second computer system that is communicatively coupled to said server computer system via the Internet, wherein said server computer system uses information in a first user profile and information in a second user profile to screen said set of URLs and to select from said set of URLs said first subset and said second subset, respectively;
wherein said first and second subsets are respectively stored at said first and second computer systems separately from said program content such that said first and second subsets are retrievable from said first and second computer systems without accessing said program content, wherein said receiving, identifying and communicating are performed automatically without user intervention; and
wherein said program content is displayed on said television, Web-based information associated with said first subset of URLs is retrieved and displayed separately on said first computer system, and Web-based information associated with said second subset of URLs is retrieved and displayed separately on said second computer system such that different users can view different Web pages while viewing the same said program content on said television.

10. The computer-usable medium of claim 9 wherein said method further comprises:
  comparing characteristics describing each URL in said set of URLs with user-specified characteristics in said first user profile;
  identifying said first subset of said set of URLs, said first subset satisfying said user-specified characteristics; and
  storing said first subset of URLs but not the entire said set of URLs.

11. The computer-usable medium of claim 10 wherein said method further comprises:
  monitoring URLs selected by a user associated with said first user profile; and
  adding characteristics describing said URLs selected by said user to said first user profile.

12. The computer-usable medium of claim 9 wherein said first and second subsets are communicated from said server computer system to said first and second computer systems via said set top box.

* * * * *